US 6,734,615 B2

(12) United States Patent
Sugawara et al.

(10) Patent No.: US 6,734,615 B2
(45) Date of Patent: May 11, 2004

(54) COLOR CATHODE RAY TUBE AND GLASS FRIT FOR COLOR CATHODE RAY TUBES

(75) Inventors: Tsunehiko Sugawara, Chiba (JP); Yutaka Segawa, Chiba (JP); Ryuichi Tanabe, Kanagawa (JP); Eiji Ichikura, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 147 days.

(21) Appl. No.: 10/161,759

(22) Filed: Jun. 5, 2002

(65) Prior Publication Data

US 2003/0067261 A1 Apr. 10, 2003

Related U.S. Application Data

(63) Continuation of application No. PCT/JP01/10250, filed on Nov. 22, 2001.

(30) Foreign Application Priority Data

Nov. 22, 2000 (JP) .................................... 2000-356582
Nov. 22, 2000 (JP) .................................... 2000-356583

(51) Int. Cl.[7] ............................. H01J 29/86; C03C 8/14
(52) U.S. Cl. ......................... 313/480; 501/17; 501/21; 501/22
(58) Field of Search ...................... 313/480; 501/15, 501/17, 21, 22, 26, 76, 79

(56) References Cited

U.S. PATENT DOCUMENTS

| 5,470,804 A | | 11/1995 | Morena ........................ 501/15 |
| 5,534,469 A | * | 7/1996 | Hayashi ........................ 501/15 |
| 5,612,261 A | * | 3/1997 | Lim et al. ..................... 501/32 |
| 5,683,948 A | | 11/1997 | Tanabe et al. ................ 501/17 |
| 5,821,182 A | * | 10/1998 | Tanabe et al. ................ 501/17 |
| 6,163,106 A | | 12/2000 | Sugawara et al. .......... 313/480 |

FOREIGN PATENT DOCUMENTS

| JP | 62-260733 | 11/1987 |
| JP | 64-14128 | 1/1989 |
| JP | 5-319863 | 12/1993 |
| JP | 8-225341 | 9/1996 |
| JP | 2001-122640 | 5/2001 |

* cited by examiner

Primary Examiner—Don K. Wong
Assistant Examiner—Thuy Vinh Tran
(74) Attorney, Agent, or Firm—Oblon, Spivak, McClelland, Maier & Neustadt, P.C.

(57) ABSTRACT

The present invention relates to a color cathode ray tube and a glass frit to be used for it, and provides a color cathode ray tube which uses a glass frit containing as a crystallizing filler, an $\alpha$-$4PbO \cdot B_2O_3$ crystal powder and/or a $Pb_3O_4$ crystal powder, and corpuscular $\alpha$-alumina, and at least one member selected from the group consisting of MgO, $Fe_2O_3$ and monoclinic $ZrO_2$, for improvement of the strength at a sealed portion and for weight saving of the color cathode ray tube, wherein the maximum tensile stress generated at the above sealed portion is from 7 to 10 MPa when the inside is vacuumized, and the area ratio of crystal is at least 50% at the interface at the above sealed portion at at least the region at which the above maximum tensile stress is generated.

15 Claims, No Drawings

COLOR CATHODE RAY TUBE AND GLASS FRIT FOR COLOR CATHODE RAY TUBES

This application is a Continuation of International Application PCT/JP01/10250, filed Nov. 22, 2001.

TECHNICAL FIELD

The present invention relates to a color cathode ray tube which is useful for a television receiver, a computer terminal display or the like, and a glass frit suitable for production of such a color cathode ray tube.

BACKGROUND ART

In a conventional color cathode ray tube, the envelope is constituted by a glass panel which supports a shadow mask for color selection and which serves as an image display portion, and a glass funnel which is located behind the glass panel and which supports a structure which provides a function of forming and scanning an electron beam.

In assembling a color cathode ray tube, in sealing of an electron gun and in a post process step such as an evacuation step, to be durable against the heat shock in a high temperature heat treatment and to maintain good airtightness, the glass panel and the glass funnel are sealed by carrying out a heat treatment at a high temperature of about 440° C. by means of a PbO—ZnO—$B_2O_3$ type low melting glass which is crystalline and which has a high content of lead oxide.

JP-A-64-14128 discloses, as a preferred one of such a crystalline glass frit, a sealing composition comprising a PbO—$B_2O_3$ type glass frit and from 0.1 to 15% of a low expansion filler and from 1 to 15% of an alumina filler, as represented by mass percentage, added to the glass frit, wherein the grain size of the alumina filler is suitably from 1 to 150 μm.

Further, JP-A-8-225341 discloses a sealing glass frit material comprising a PbO—ZnO—$B_2O_3$ type low melting glass and an alumina powder added to the glass frit in an amount of not more than 5% as represented by mass percentage. It discloses an alumina powder having an average particle size smaller than 5 μm as a preferred one, and a sealing glass material having 3 wt % of alumina with an average particle size of 3.3 μm added thereto is exemplified.

In recent years, color cathode ray tubes become larger and the faceplate at the glass panel becomes flat, and resultingly a maximum value of a tensile deforming stress generated at the sealed portion between the glass panel and the glass funnel when the inside of a color cathode ray tube is vacuumized (hereinafter sometimes referred to as "tensile vacuum deforming stress") tends to increase. Accordingly, to deal with this, the thickness of the glass at the sealed portion is increased. Therefore, in a conventional color cathode ray tube, the maximum tensile vacuum deforming stress generated at the sealed portion is substantially weak and is usually suppressed to be less than 7 MPa, and there has been no problem even though the strength at the sealed portion is not so high.

However, in view of weight saving of color cathode ray tubes, it is strongly desired to make the glass thin. However, when the glass becomes thin, generation of a tensile vacuum deforming stress of at least 7 MPa at the sealed portion between the glass panel and the glass funnel is inevitable. Accordingly, a sealed portion having a high strength, which tolerates a heavy tensile vacuum deforming stress generated at the sealed portion, and a glass frit which realizes such a high strength sealed portion, are desired. However, with a glass frit which is practically used at present or the above-described known glass frit, the strength is insufficient at the sealed portion especially at the sealing interface, and accordingly the above objects can not be achieved.

Specifically, with a glass frit which is used practically at present or a known glass frit, increase in strength of a sintered product of the glass frit and improvement in sealing properties of a color cathode ray tube may be attempted by addition of alumina. However, no good reactivity with the glass panel or the glass funnel can be obtained, and accordingly sealing force at the interface at the sealed portion with the glass is insufficient. Accordingly, in a case of color cathode ray tubes in which a heavy tensile vacuum deforming stress is generated at the sealed portion, since thermal stress is further applied thereto in a production step, they can not tolerate the stress and they are likely to break during their production.

For example, with respect to the sealing composition as disclosed in JP-A-64-14128, although improvement of the strength of the sealing composition itself is confirmed by addition of alumina, however, since the particle size and the addition amount of the alumina to be added are inappropriate, the area ratio of crystal at the sealing interface is only at a level of from 30 to 45%, and the sealing force at the interface at the sealed portion is low.

Further, with respect to the sealing glass frit material as disclosed in JP-A-8-225341, the strength of the sintered sealing glass frit material increases similarly by addition of alumina having an average particle size not larger than 5 μm, however, sealing strength at the sealing interface is inadequate. Namely, fluidity is improved by addition of alumina, whereby a seal shape which tolerates the stress can be obtained, however, no adequate reactivity with glass can be obtained with alumina having an average particle size of 3.3 μm, and the sealing strength at the sealing interface is inadequate.

Accordingly, in a case of color cathode ray tubes in which a maximum tensile vacuum deforming stress of at least 7 MPa is generated, since stress generated due to difference in temperature (hereinafter sometimes referred to as "thermal stress") is further applied thereto in a production step, the sealed portion by means of the above glass frit can not tolerate such a stress, and color cathode ray tubes are likely to break during their production. Further, in order to suppress the maximum tensile vacuum deforming stress to be less than 7 MPa, the thickness of the glass has to be maintained, whereby weight saving of color cathode ray tubes tends to be difficult.

DISCLOSURE OF THE INVENTION

The present invention has been made to overcome the above problems.

The present invention provides a color cathode ray tube having a sealed portion at which a glass panel and a glass funnel are sealed by means of a sintered glass frit, wherein the maximum tensile stress generated at the above sealed portion is from 7 to 10 MPa when the inside of said color cathode ray tube is vacuumized, the above sintered glass frit contains at least a crystalline low melting glass and a low expansion filler containing α-alumina, and the area ratio of crystal is at least 50% at the interface at the sealed portion at at least the region at which the above maximum tensile stress is generated.

In said cathode ray tube, the above frit sintered product glass preferably contains a low expansion filler containing α-alumina and a crystalline low melting glass, and the contents of the respective components as represented by mass percentage based on the sintered glass frit are preferably such that the crystalline low melting glass: 90–99% and the low expansion filler: 1–10%, the content of the above and α-alumina is preferably from 0.1 to 7% based on the sintered glass frit. Further, part of particles of the α-alumina is preferably corpuscular α-alumina having a particle size not larger than 3 μm, and the content of the corpuscular α-alumina is preferably from 0.1 to 5% as represented by mass percentage based on the sintered glass frit.

Further, in the cathode ray tube of the present invention, the above sintered glass frit preferably contains a low expansion filler containing α-alumina, a crystalline low melting glass and a crystallizing filler containing MgO and/or $Fe_2O_3$, and the contents of the respective components as represented by mass percentage based on the sintered glass frit are preferably such that the crystalline low melting glass: 90–98.9% and the low expansion filler: 1–9.9%, the content of the above α-alumina is preferably from 0.1 to 7% based on the sintered glass frit. Further, the sum of the masses of MgO and $Fe_2O_3$ as represented by mass percentage based on the sintered glass frit is preferably from 0.1 to 5%.

Further, in the color cathode ray tube of the present invention, the above sintered glass frit preferably contains a low expansion filler containing α-alumina, a crystalline low melting glass and a monoclinic-$ZrO_2$ as a crystallizing filler, and the contents of the respective components as represented by mass percentage based on the sintered glass frit are preferably such that the crystalline low melting glass: 90–98.99% and the low expansion filler: 1–9.99%, and the content of the above α-alumina is preferably from 0.1 to 7% based on the sintered glass frit. Further, the content of the monoclinic-$ZrO_2$ is preferably from 0.01 to 1% as represented by mass percentage based on the sintered glass frit.

The above crystalline low melting glass preferably consists essentially of, as represented by mass percentage based on the following oxides:

| | |
|---|---|
| PbO: | 71–81.99%, |
| ZnO: | 9–16%, |
| $B_2O_3$: | 7–10%, |
| $SiO_2$: | 1–3%, |
| BaO: | 0–3%, |
| CaO: | 0–3%, |
| SrO: | 0–3%, |
| $Li_2O$: | 0–3%, |
| $Na_2O$: | 0–3%, |
| $K_2O$: | 0–3%, |
| $Al_2O_3$: | 0–5%, |
| $Bi_2O_3$: | 0–10%, | and the low expansion filler more preferably contains at least one member selected from the group consisting of zircon, cordierite, mullite, lead titanate, silica, β-eucryptite, β-spodumene and β-quartz solid solution.

Further, the present invention provides, as a first glass frit for production of the above-described color cathode ray tube, a glass frit which comprises a crystalline low melting glass powder, a filler containing α-alumina, and a crystallizing filler consisting of an α-$4PbO.B_2O_3$ crystal powder and/or a $Pb_3O_4$ crystal powder, wherein part of the above α-alumina is corpuscular α-alumina having a particle size not larger than 3 μm, and the contents of the respective components as represented by mass percentage based on the glass frit are such that the crystalline low melting glass powder: 90–99% and the low expansion filler: 1–10%, and the content of the above α-alumina is from 0.1 to 7%, and the content of the corpuscular α-alumina of the above α-alumina is from 0.1 to 5% based on the sintered glass frit.

The present invention further provides, as a second glass frit, a glass frit which comprises a crystalline low melting glass powder, a low expansion filler containing α-alumina, and a crystallizing filler containing an α-$4PbO.B_2O_3$ crystal powder and/or a $Pb_3O_4$ crystal powder, and at least one member selected from the group consisting of MgO, $Fe_2O_3$ and monoclinic-$ZrO_2$, wherein the contents of the respective components as represented by mass percentage based on the glass frit are such that the crystalline low melting glass powder: 90–98.99%, the low expansion filler: 1–9.99% and the crystallizing filler: 0.01–5%, and the content of the above α-alumina is from 0.1 to 7% based on the glass frit.

In the above glass frit, the above crystalline low melting glass powder preferably consists essentially of, as represented by mass percentage based on the following oxides:

| | |
|---|---|
| PbO: | 71–81.99%, |
| ZnO: | 9–16%, |
| $B_2O_3$: | 7–10%, |
| $SiO_2$: | 1–3%, |
| BaO: | 0–3%, |
| CaO: | 0–3%, |
| SrO: | 0–3%, |
| $Li_2O$: | 0–3%, |
| $Na_2O$: | 0–3%, |
| $K_2O$: | 0–3%, |
| $Al_2O_3$: | 0–5%, |
| $Bi_2O_3$: | 0–10%, | and the filler preferably contains at least one member selected from the group consisting of zircon, cordierite, mullite, lead titanate, silica, β-eucryptite, β-spodumene and β-quartz solid solution.

The present invention has been accomplished as a result of extensive studies on mechanism how a high strength appears at the sealed portion, in order to provide a color cathode ray tube which is light weight and in which a heavy tensile vacuum deforming stress is generated. Namely, when the glass is made thin for weight saving, a maximum tensile vacuum deforming stress of from 7 to 10 MPa is generated at at least part of the sealed portion between the glass panel and the glass funnel sealed by means of the sintered glass frit due to the reduced pressure. Accordingly, the above sealed portion has to have at least a strength to tolerate this stress.

In order to obtain the desired strength at the sealed portion, it is important, in addition to a high strength of the sintered glass frit itself, to improve wettability between the sintered glass frit and the glass panel and between the sintered glass frit and the glass funnel to make such a seal shape that no excess tensile stress is generated, and to improve reactivity at the interfaces between the sintered glass frit and the glass panel and between the sintered glass frit and the glass funnel to improve the sealing force. Particularly important is the sealing strength at the sealing interfaces with the glass panel and the glass funnel.

In order to overcome the above problems, the present inventors have conducted studies on improvement in fluidity of the glass frit, improvement in reactivity between the glass frit and the glass interfaces, and the relation between the strength and the area ratio of crystal at the sealing interface, and as a result, they have found that as a sintered glass frit which satisfies thermal strength with which no fracture occurs even in a temperature-lowering step at the time of sealing and in a post process step such as an evacuation step, one containing a corpuscular α-alumina powder having a particle size not larger than 3 μm and at least one member selected from the group consisting of MgO, $Fe_2O_3$ and monoclinic-$ZrO_2$ in appropriate amounts is effective. Further, they have found that corpuscular α-alumina having a particle size not larger than 3 μm, and MgO, $Fe_2O_3$ or monoclinic-$ZrO_2$ improve the area ratio of crystal at the sealing interface, and when the area ratio of crystal of the sintered glass frit is at least 50% at the interface at the sealed portion, the sealing strength at the interface is remarkably improved and properties required are satisfied. The present invention has been accomplished on the basis of these discoveries.

Now, the present invention will be explained in detail with reference to the preferred embodiments. The glass frit of the present invention is to seal the glass panel and the glass funnel of a color cathode ray tube, and a baked and sintered "glass frit" is referred to as "sintered glass frit", and a baked and sintered "crystalline low melting glass powder" is referred to as "crystalline low melting glass".

With respect to the glass frit of the present invention to be used for sealing of a color cathode ray tube, usually a crystalline low melting glass powder and a filler are mixed with a vehicle and formed into a paste. The vehicle may, for example, be a solution having nitrocellulose dissolved in isoamyl acetate. The above paste is coated on the glass panel and the glass funnel of a color cathode ray tube at a portion at which they are sealed, followed by baking. In such a case, the baking may be carried out, for example, by holding the assembly at a temperature of from 400 to 450° C. for from 30 to 40 minutes.

The crystalline low melting glass of the present invention is characterized as such a glass that an exothermic peak appears in a differential thermal analysis wherein the temperature is raised at 10° C./min and held at from 350 to 500° C. for 2 hours. Namely, it is a glass which crystallizes under the above conditions. It is preferably such a glass that an exothermic peak appears in a differential thermal analysis wherein the temperature is raised at 10° C./min and held at from 400 to 450° C. for 2 hours. Further, the low melting glass is a glass having a softening point of at most 600° C. Accordingly, the crystalline low melting glass is a glass which has a softening point of at most 600° C. and which crystallizes under the above conditions.

In the present invention, as the crystalline low melting glass to be a basic component of the sintered glass frit, a PbO—ZnO—$B_2O_3$ type glass is suitable. This glass is a crystalline glass which contains PbO, ZnO and $B_2O_3$, in which first crystals (2PbO.ZnO.$B_2O_3$) appear with time and then second crystals (α-4PbO.$B_2O_3$) appear when it is held at from 350 to 500° C. Preferred is a glass in which the first and second crystals precipitate as mentioned above when it is held at from 400 to 450° C.

The low expansion filler in the present invention is preferably a ceramic powder having an average coefficient of linear thermal expansion (hereinafter referred to simply as expansion coefficient) of at most $70\times10^{-7}$/° C. at from room temperature to 300° C.

α-alumina is essential for the low expansion filler. Namely, α-alumina is essential to obtain a desired sealing strength as mentioned hereinafter, and particularly corpuscular α-alumina having a particle size not larger than 3 μm is a component effective for improvement of the area ratio of crystal at the sealing interface. Usually, preferred is one obtained by mixing α-alumina with at least one member selected from the group consisting of zircon, cordierite, mullite, lead titanate, silica, β-eucryptite, β-spodumene and β-quartz solid solution, in view of handling efficiency.

Further, as a component effective for improvement of the area ratio of crystal at the interface of the sealed portion, i.e. as a crystallizing filler, MgO, $Fe_2O_3$ or monoclinic-$ZrO_2$ is employed. Among these three types of crystallizing fillers, one or at least two may be used, and they may be used together with the corpuscular α-alumina.

The inside of the sealed glass panel and the glass funnel is evacuated into a high vacuum of at most $1.33\times10^{-4}$ Pa usually at a high temperature of from 300 to 380° C. At this time, the sintered glass frit is crystallized to form a firm sealed layer, and does not flow or bubble.

Further, the expansion coefficient of the above sintered glass frit is preferably from $70\times10^{-7}$ to $110\times10^{-7}$/° C. to match the expansion coefficient with the glass panel and the glass funnel of a color cathode ray tube. It is more preferably from $80\times10^{-7}$ to $105\times10^{-7}$/° C., most preferably from $90\times10^{-7}$ to $100\times10^{-7}$/° C.

Now, the composition of the sintered glass frit to seal the glass panel and the glass funnel of the color cathode ray tube of the present invention will be explained below. Here, the contents are represented by mass percentage and hereinafter will be represented simply by %.

The sintered glass frit of the present invention substantially comprises e.g. a PbO—ZnO—$B_2O_3$ type crystalline low melting glass and a low expansion filler containing α-alumina. Here, the above crystalline low melting glass is a component useful for imparting fluidity, and the low expansion filler containing α-alumina is useful for improvement of the strength and acceleration of crystallization, and makes the coefficient of thermal expansion of the sintered glass frit a predetermined value.

As a first embodiment of the color cathode ray tube of the present invention, an example may be mentioned wherein from 90 to 99% of the crystalline low melting glass and from 1 to 10% of the low expansion filler are used as represented by mass percentage based on the sintered glass frit. Here, if the content of the low expansion filler exceeds 10%, the content of the crystalline low melting glass becomes less than 90%, whereby the fluidity tends to decrease, and airtightness of the sealed portion may decrease. It is preferably at most 8%. Further, if the content of the low expansion filler is less than 1%, the expansion coefficient of the sintered glass frit tends to be too high, whereby there is such a problem as fracture at the sealed portion or such a problem that no desired strength can be obtained. The content of the low expansion filler is more preferably at least 2%.

In the above low expansion filler, a content of from 0.1 to 7% based on the sintered glass frit preferably consists of α-alumina. This α-alumina is an essential component to increase the strength of the sintered glass frit and the sealed portion by itself or in combination with another selected low expansion filler and to decrease the expansion coefficient of the sintered glass frit into a predetermined value. If the α-alumina exceeds 7%, the fluidity tends to be too low. It is more preferably at most 5%. Further, if it is less than 0.1%, corpuscular α-alumina having a particle size not larger than 3 μm, which has a significant influence over the area ratio of crystal at the sealed interface necessarily becomes less than 0.1%, whereby no desired strength properties may be obtained. In order to stably obtain an area ratio of crystal of at least 50%, the content of the α-alumina based on the sintered glass frit is preferably at least 0.3%.

Further, part of the above α-alumina, specifically a content of from 0.1 to 5% based on the sintered glass frit, preferably consists of corpuscular α-alumina having a particle size not larger than 3 μm. Namely, it is essential that corpuscular α-alumina having a particle size not larger than 3 μm and α-alumina having a particle size larger than 3 μm are mixed and used as α-alumina, and from 0.1 to 5% based on the mass of the sintered glass frit is corpuscular α-alumina having a particle size not larger than 3 μm.

This corpuscular α-alumina having a particle size not larger than 3 μm is a component effective to increase the area ratio of crystal at the interface at the sealed portion and to generate sealing force to tolerate thermal stress generated in a temperature-raising or temperature-lowering step at a heat treatment in production of a color cathode ray tube. If the content of the corpuscular α-alumina based on the sintered glass frit exceeds 5%, fluidity during sintering tends to decrease, whereby excess tensile stress may be generated at the sealed portion or the strength of the sintered glass frit may decrease. It is more preferably at most 4.5%. Further, if the content of the corpuscular α-alumina based on the sintered glass frit is less than 0.1%, the area ratio of crystal at the interface at the sealed portion tends to be small, whereby the sealing force between the sintered glass frit and the glass panel and between the sintered glass frit and the glass funnel tends to decrease, and the assembly is likely to fracture peel-wise at the interface at the sealed portion with the glass panel or the glass funnel in a temperature-raising or temperature-lowering step at a heat treatment in production of a color cathode ray tube. The content of the corpuscular α-alumina is more preferably at least 0.5% based on the sintered glass frit.

Here, in the present invention, the particle size of the α-alumina particles is an average value of the major axis and the minor axis of alumina particles having various shapes, and is obtained by electron microscopic observation of a cross-section of the sintered glass frit and measuring all alumina particles present in an area of 0.5 mm×0.5 mm, for example.

As a second embodiment of the color cathode ray tube of the present invention, an example may be mentioned wherein from 90 to 98.9% of a crystalline low melting glass, from 1 to 9.9% of a low expansion filler and from 0.1 to 5% of a crystallizing filler containing MgO and/or $Fe_2O_3$ are employed based on the sintered glass frit.

If the content of the low expansion filler exceeds 9.9%, the content of the crystalline low melting glass becomes less than 90%, whereby fluidity tends to decrease, and the airtightness at the sealed portion may decrease. It is preferably at most 8%. Further, if the content of the low expansion filler is less than 1%, the expansion coefficient of the sintered glass frit tends to be too high, whereby there is such a problem as fracture at the sealed portion or such a problem that no desired strength may be obtained. The content of the low expansion filler is more preferably at least 2%.

Here, in the low expansion filler, a content of from 0.1 to 7% based on the sintered glass frit consists of α-alumina. This α-alumina is an essential component to increase the strength of the sintered glass frit and the sealed portion by itself or in combination with another selected low expansion filler and to decrease the expansion coefficient of the sintered glass frit into a predetermined value. If the α-alumina exceeds 7%, the fluidity tends to be too low. It is more preferably at most 5%. Further, in order to stably obtain an area ratio of crystal of at least 50%, the content of α-alumina based on the sintered glass frit is preferably at least 0.3%.

Further, one of MgO and $Fe_2O_3$ as the crystallizing filler may be used or a mixture of both may be used, but the content of the crystallizing filler consisting of MgO and/or $Fe_2O_3$ is preferably from 0.1 to 5% based on the sintered glass frit. MgO and $Fe_2O_3$ are components effective to increase the area ratio of crystal at the interface at the sealed portion and to generate a sealing force to tolerate stress (thermal stress) due to heat generated in a temperature-raising or temperature-lowering step at a heat treatment in production of a color cathode ray tube.

If the content of the crystallizing filler consisting of MgO and/or $Fe_2O_3$ exceeds 5% based on the sintered glass frit, fluidity during sintering tends to decrease, whereby excess tensile stress may be generated at the sealed portion or the strength of the sintered glass frit may decrease. Here, the above content is more preferably at most 4.5%.

If the content of the crystallizing filler consisting of MgO and/or $Fe_2O_3$ is less than 0.1% based on the sintered glass frit, the area ratio of crystal at the interface at the sealed portion tends to be low, whereby the sealing force between the sintered glass frit and the glass panel and between the sintered glass frit and the glass funnel tends to decrease, whereby the assembly is likely to fracture peel-wise at the interface at the sealed portion with the glass panel or with the glass funnel in a temperature-raising or temperature-lowering step at a heat treatment in production of a color cathode ray tube. The above content is more preferably at least 0.5%.

Further, as a third embodiment of the color cathode ray tube of the present invention, an example may be mentioned wherein from 90 to 98.99% of a crystalline low melting glass, from 1 to 9.99% of a low expansion filler and from 0.01 to 1% of monoclinic-$ZrO_2$ as a crystallizing filler are employed as represented by mass percentage based on the sintered glass frit.

Here, if the content of the low expansion filler exceeds 9.99%, the content of the crystalline low melting glass becomes less than 90%, whereby fluidity tends to decrease, and airtightness at the sealed portion may decrease. It is preferably at most 8%. Further, if the content of the low expansion filler is less than 1%, the expansion coefficient of the sintered glass frit tends to be too high, and there is such a problem as fracture at the sealed portion or such a problem that no predetermined strength may be obtained. The content of the low expansion filler is more preferably at least 2%.

Here, in the above low expansion filler, a content of from 0.1 to 7% based on the sintered glass frit consists of α-alumina. This α-alumina is an essential component to increase the strength of the sintered glass frit or the sealed portion by itself or in combination with another selected low expansion filler and to decrease the expansion coefficient of the sintered glass frit into a predetermined value. If the α-alumina exceeds 7%, the fluidity tends to be too low. It is more preferably at most 5%. Further, in order to stably obtain an area ratio of crystal of at least 50%, the content of the α-alumina based on the sintered glass frit is preferably at least 0.3%.

Further, the content of a powder of the monoclinic-$ZrO_2$ as the crystallizing filler is preferably from 0.01 to 1% based on the sintered glass frit. The above monoclinic-$ZrO_2$ is a component effective to increase the area ratio of crystal at the interface at the sealed portion and to generate a sealing force to tolerate thermal stress generated in a heat-raising or heat-lowering step at a heat treatment in production of a color cathode ray tube, as MgO and $Fe_2O_3$. If the content of the monoclinic-$ZrO_2$ as the crystallizing filler exceeds 1% based on the sintered glass frit, fluidity during sintering tends to decrease, whereby excess tensile stress may be generated at the sealed portion or the strength of the sintered glass frit may decrease. The above content is more preferably at most 0.5%. Further, if the content of the above monoclinic-$ZrO_2$ is less than 0.01% based on the sintered glass frit, the area ratio of crystal at the sealing interface tends to be low, whereby the sealing force between the sintered glass frit and the glass panel and between the sintered glass frit and the glass funnel tends to decrease, and the assembly is likely to fracture peel-wise at the sealing interface with the glass panel or the glass funnel in a heat-raising or heat-lowering step at a heat treatment in production of a color cathode ray tube. The above content is more preferably at least 0.03%.

On the other hand, the crystalline low melting glass is suitably a PbO—ZnO—$B_2O_3$ type glass, which consists, for example, essentially of the following components as represented by mass percentage based on the following oxides:

| | |
|---|---|
| PbO: | 71–81.99%, |
| ZnO: | 9–16%, |
| $B_2O_3$: | 7–10%, |
| $SiO_2$: | 1–3%, |
| BaO: | 0–3%, |
| CaO: | 0–3%, |
| SrO: | 0–3%, |
| $Li_2O$: | 0–3%, |
| $Na_2O$: | 0–3%, |
| $K_2O$: | 0–3%, |
| $Al_2O_3$: | 0–5%, |
| $Bi_2O_3$: | 0–10%. |

Further, more preferred crystalline low melting glass consists essentially of, as represented by mass percentage based on the following oxides:

| | |
|---|---|
| PbO: | 71.5–78%, |
| ZnO: | 10.5–14.5%, |
| $B_2O_3$: | 7–10%, |
| $SiO_2$: | 1.65–3%, |
| BaO: | 0.1–1.85%, |
| CaO: | 0–1.5%, |
| SrO: | 0–1.5%, |
| $Li_2O$: | 0–3%, |
| $Na_2O$: | 0–3%, |
| $K_2O$: | 0–3%, |
| $Al_2O_3$: | 0–5%, |
| $Bi_2O_3$: | 0–10%, | with a total content of BaO, CaO and SrO of from 0 to 1.5%, and a mass ratio of the ZnO content to the PbO content i.e. ZnO/PbO of from 0.14 to 0.20.

Now, the above composition will be explained below by representing mass percentage simply as %.

If the content of PbO is less than 71%, the softening point tends to be too high, whereby fluidity tends to decrease, and the strength and/or airtightness at the sealed portion may decrease. It is preferably at least 71.5%, more preferably at least 74.5%. If it exceeds 81.99%, the softening point tends to be too low, and the temperature-raising rate at the time of evacuation may not be made adequately high. It is preferably at most 78%, more preferably at most 77%, particularly preferably at most 76%.

If the content of ZnO is less than 9%, the softening point tends to be too high, whereby the crystalline low melting glass is less likely to crystallize. It is more preferably at least 10.5%, furthermore preferably at least 11.5%, particularly preferably at least 12.1%. If it exceeds 16%, devitrification is likely to form during melting of the glass. It is preferably at most 14.5%, more preferably at most 13.5%.

The mass ratio of the ZnO content to the PbO content i.e. ZnO/PbO is a parameter which satisfies both sealing in a short period of time and a high temperature-raising rate at the time of evacuation, and is preferably within a range of from 0.14 to 0.20. If it is less than 0.14, the temperature-raising rate at the time of evacuation may not adequately high. It is more preferably at least 0.15. If it exceeds 0.20, fluidity tends to decrease, whereby the strength may decrease, and further, the crystalline glass is less likely to crystallize, whereby sealing in a short period of time may be difficult. It is more preferably at most 0.18.

If the content of $B_2O_3$ is less than 7%, the softening point tends to be too high, whereby fluidity tends to decrease. It is more preferably at least 8%. If it exceeds 10%, chemical durability tends to be poor. It is preferably at most 9.5%.

The content of $SiO_2$ is an important parameter to make it possible to increase the temperature-raising rate at the time of evacuation. If it is less than 1%, the crystallization rate tends to be too high, whereby the temperature-raising rate at the time of evacuation may not adequately be high. It is preferably at least 1.65%, more preferably at least 1.7%. In the vicinity of the upper limit of the acceptable range of the content, properties do not change as drastically as in the vicinity of the lower limit, but if it exceeds 3%, the softening point tends to be too high, whereby fluidity tends to decrease. It is preferably at most 2.5%.

BaO is not an essential component but may be incorporated up to 3% so as to satisfy both sealing in a short period of time and a high temperature-raising rate at the time of evacuation. If it exceeds 3%, the crystallization rate tends to be too low, whereby sealing can not be carried out in a short period of time. It is more preferably at most 1.85%, particularly preferably at most 1.80%. In a case where it is attempted to further increase the temperature-raising rate at the time of evacuation, it is preferred to incorporate BaO in an amount of at least 0.1%. It is more preferably at least 0.6%.

CaO and SrO are not essential but may be incorporated up to 3% each so as to increase solubility of the glass. If each content exceeds 3%, the crystallization rate may be too low. It is more preferably at most 1.5%.

The total content of BaO, CaO and SrO is preferably from 0.5 to 1.85% so as to increase the sealing strength. If it exceeds 1.85%, the crystallization rate tends to be too low. It is more preferably at most 1.8%.

$Li_2O$, $Na_2O$ and $K_2O$ are not essential but may be incorporated up to 3% each so as to increase solubility of the glass. If each content exceeds 3%, electrical insulating properties tend to decrease.

$Al_2O_3$ is not essential but may be incorporated up to 5% so as to increase chemical durability. If it exceeds 5%, fluidity may decrease.

$Bi_2O_3$ is not essential but may be incorporated up to 10% so as to increase fluidity. If it exceeds 10%, the crystalline glass is less likely to crystallize.

The crystalline low melting glass preferably consists essentially of the above components, but may contain components other than the above components up to 3% in total within a range of not impairing the object of the present invention. A coloring agent such as $Fe_2O_3$ may, for example, be mentioned.

Here, preferably no halogen particular no F is contained. A halogen particularly F may gasify during use of a color cathode ray tube to deteriorate properties of the electron gun in the color cathode ray tube (emission slump phenomenon).

Further, the above low expansion filler preferably contains at least one member selected from the group consisting of zircon, cordierite, mullite, lead titanate, silica, β-eucryptite, β-spodumene and β-quartz solid solution.

The color cathode ray tube of the present invention has been explained above, and such a color cathode ray tube is sealed by means of the glass frit according to the first embodiment of the present invention, comprising a crystalline low melting glass powder, a low expansion filler containing α-alumina, and a crystallizing filler consisting of an α-4PbO.B$_2$O$_3$ crystal powder and/or a Pb$_3$O$_4$ crystal powder, wherein part of the α-alumina is corpuscular α-alumina having a particle size not larger than 3 µm, and the contents of the respective components as represented by mass percentage based on the glass frit are such that the crystalline low melting glass powder: 90–99%, the low expansion filler: 1–10%, the α-alumina: 0.1–7% and the corpuscular α-alumina: 0.1–5%.

Otherwise, it is sealed by means of the glass frit according to the second embodiment of the present invention, comprising a crystalline low melting glass powder, a low expansion filler containing α-alumina, and a crystallizing filler containing an α-4PbO.B$_2$O$_3$ crystal powder and/or a Pb$_3$O$_4$ crystal powder and at least one member selected from the group consisting of MgO, Fe$_2$O$_3$ and monoclinic-ZrO$_2$, wherein the contents of the respective components as represented by mass percentage based on the glass frit are such that the crystalline low melting glass powder: 90–98.99%, the low expansion filler: 1–9.99%, the α-alumina: 0.1–7% and the crystallizing filler: 0.01 to 5%.

The α-4PbO.B$_2$O$_3$ crystal powder and the Pb$_3$O$_4$ crystal powder in such a glass frit are seed crystals to accelerate crystallization of the crystalline low melting glass powder i.e. a crystallizing filler and a component to accelerate precipitation of second crystals (α-4PbO.B$_2$O$_3$), and one of the α-4PbO.B$_2$O$_3$ crystal powder and the Pb$_3$O$_4$ crystal powder or both may be used.

When the above α-4PbO.B$_2$O$_3$ crystal powder and/or the Pb$_3$O$_4$ crystal powder are incorporated in the glass frit, precipitation of PbO crystals can be suppressed due to precipitation of the above second crystals. The precipitation of the PbO crystals may decrease electrical insulating properties at the sealed portion in a case of sealing of the glass panel and the glass funnel, and it is necessary to suppress precipitation of the PbO crystals. Precipitation of the above second crystals overcomes this problem.

The total content of the α-4PbO.B$_2$O$_3$ crystal powder and the Pb$_3$O$_4$ crystal powder is at most 2.9% based on the mass of the glass frit as represented by mass percentage. If the content of the crystallizing filler exceeds 2.9%, sintering properties tend to decrease. It is more preferably at most 1%, furthermore preferably at most 0.3%. However, if it is less than 0.0001%, the effect to accelerate precipitation of the second crystals tends to be small, and accordingly the content of the crystallizing filler is at least 0.0001%, preferably at least 0.0002%, more preferably at least 0.0003%, particularly preferably at least 0.001%, most preferably at least 0.01%.

The α-4PbO.B$_2$O$_3$ crystal powder is prepared, for example, as follows. Namely, a starting material blended so that PbO:B$_2$O$_3$ would be 4 mol:1 mol, is dissolved at 900° C. for 1 hour and formed into flakes, followed by heat treatment at 440° C. for 1 hour, and the obtained product is pulverized in a ball mill for a predetermined time to obtain a powdered product. Pb$_3$O$_4$ may be a commercially available one.

The above crystalline low melting glass powder is a glass having a glass transition point of at most 400° C., and accordingly by holding it at a temperature of at least 400° C., the "crystalline low melting glass powder" is baked, and by lowering the temperature to room temperature, a "crystalline low melting glass" is obtained to seal the glass panel and the glass funnel. Further, the above glass frit preferably has an average coefficient of thermal expansion of from $80 \times 10^{-7}$ to $110 \times 10^{-7}$/° C. at from room temperature to 300° C. after baking. If the average coefficient of thermal expansion of the sintered glass frit at from room temperature to 300° C. is beyond the above range, a tensile stress applies to the glass panel, the glass funnel or the sealed portion thereof after sealing, whereby the strength of the color cathode ray tube after sealing tends to decrease.

Now, the area ratio of crystal at the interface at the sealed portion will be explained below.

Usually the interface at the sealed portion is in a specific crystalline state which is different from the inside of the sintered glass frit, due to reaction between the crystalline low melting glass and the glass to be sealed at the time of sintering the glass frit. Namely, the interfacial crystals and interfacial residual glass phase coexist, and proportions and components thereof are different from those in a crystalline state in the inside of the sintered glass frit.

The interfacial crystals are a solid solution of PbZnSiO$_4$ and a glass component and contain a small amount of PbO and B$_2$O$_3$ and a large amount of SiO$_2$ as compared with crystals in the inside of the sintered glass frit, and further contain a small amount of alkalis (Na$_2$O, K$_2$O) and alkaline earths (MgO, CaO). The interfacial residual glass phase also contains a larger amount of alkali contents than the crystals in the inside of the sintered glass frit. The area ratio of crystal at the interface at the sealed portion is a proportion of the interfacial crystals.

The glass frit of the present invention further contains, in addition to the above α-4PbO.B$_2$O$_3$ crystal powder and/or the Pb$_3$O$_4$ crystal powder, a corpuscular α-alumina powder having a particle size not larger than 3 µm, or at least one member selected from the group consisting of MgO, Fe$_2$O$_3$ and monoclinic-ZrO$_2$, whereby the area ratio of crystal at the interface at the sealed portion can remarkably be improved. Here, both of the corpuscular α-alumina powder and at least one member selected from the group consisting of MgO, Fe$_2$O$_3$ and monoclinic-ZrO$_2$ may be contained. The higher the area ratio of crystal, the higher the adhesive strength.

The strength of the sintered glass frit is totally different from the sealing strength at the interface at the sealed portion, and even if the sintered glass frit itself has an adequate strength, if the sealing strength is low, the assembly will fracture at the interface at the sealed portion peel-wise. In order to obtain the desired sealing strength, the area ratio of crystal at the interface at the sealed portion is required to be at least 50%.

The tensile vacuum deforming stress generated at the sealed portion of a color cathode ray tube varies depending upon the region in a rectangular edge of the sealed portion, and achieves the maximum usually at the center of the long side. Further, a stress due to heat is generated in the color cathode ray tube during its production, and accordingly the sealed portion of the color cathode ray tube is required to have a strength to tolerate these stresses. In the sealed portion, a highest strength is required at a region at which the maximum tensile vacuum deforming stress is generated, and accordingly when a desired sealing strength is obtained at this region, the strength at the other region is substantially satisfied.

Accordingly, in the present invention, the area ratio of crystal at the interface at the sealed portion is at least 50% at at least a region at which the tensile vacuum deforming stress is maximum, and the strength at this region is ensured. If the area ratio of crystal is less than 50%, the sealed portion may not tolerate the stress generated in a temperature-raising or temperature-lowering step at a heat treatment in production of a color cathode ray tube (hereinafter sometimes referred to as "thermal stress"), and the assembly may fracture peel-wise at the glass interface between the sintered glass frit and the glass panel or between the sintered glass frit and the glass funnel. The area ratio of crystal is preferably at least 60%, more preferably at least 70%. Here, the area ratio of crystal at the interface at the sealed portion is usually substantially the same over the entire sealed portion, but the area ratio of crystal at a region other than the region at which the maximum vacuum deforming stress is generated may be less than 50% if there is no problem.

The glass frit of the present invention is excellent in sealing strength at the interface at the sealed portion and is particularly useful for color cathode ray tubes, but may be used widely for adhesion or covering of other glass components, or glass components and ceramics or metals.

BEST MODE FOR CARRYING OUT THE INVENTION

Examples will be shown wherein a glass panel and a glass funnel were sealed by means of a glass frit as identified in Table 1 or 2 to produce a glass bulb for a color cathode ray tube (hereinafter sometimes referred to as "glass bulb"). With respect to this bulb, the hydraulic pressure resistant strength, the critical evacuation temperature-raising rate, and presence or absence of fracture at the interface between the glass panel or the glass funnel and the sealing layer in a quenching test after sealing were examined by methods as mentioned hereinafter. Here, Examples 1 to 14 are Examples of the present invention, and Examples 15 to 21 are Comparative Examples.

The crystalline low melting glass powder to be used for the glass frit was prepared in such a manner that starting materials were blended and mixed in accordance with a conventional method so as to obtain the following compositions, and the mixture was melted at a temperature of from 1,000 to 1,200° C. for vitrification. Then, this vitrified product was water-granulated or passed through rollers and formed into flakes, which were further pulverized in a ball mill for a predetermined time to obtain a crystalline low melting glass powder having the following compositions:

| | |
|---|---|
| PbO: | 75.5% |
| ZnO: | 12.0% |
| $B_2O_3$: | 9.0% |
| $SiO_2$: | 2.0% |
| BaO: | 1.5%. |

Then, this crystalline low melting glass powder, a low expansion filler and a crystallizing filler were mixed in proportions as identified in Table 1 or 2 (unit: mass percentage based on glass frit) to obtain a glass frit of each Example.

The glass frit thus obtained was interposed between a glass funnel (expansion coefficient: $98 \times 10^{-7}/°$ C.) and a glass panel (expansion coefficient: $98 \times 10^{-7}/°$ C.) of each of 25 inch type and 29 inch type color cathode ray tubes, and the glass funnel and the glass panel were sealed under baking conditions as identified in Table 1 or 2 to produce a glass bulb. With respect to this glass bulb, the hydraulic pressure resistant strength and the critical evacuation temperature-raising rate were measured and evaluated. Further, the presence or absence of fracture at the interface between the glass panel or the glass funnel with the glass frit by a quenching test after sealing and the area ratio of crystal at the interface at the sealed portion at the crack source were examined. The measuring and evaluation methods are as follows.

Hydraulic pressure resistant strength: A pressure difference by water was applied to the inside and outside of the 25 inch type bulb, and the pressure difference at the time of fracture was measured. This measurement was carried out five times and the average value was calculated. To ensure the strength as a bulb, it is preferably at least 0.45 MPa, more preferably at least 0.46 MPa, particularly preferably at least 0.47 MPa.

Critical evacuation temperature-raising rate: The 29 inch type bulb was heated at various temperature-raising rates while evacuating it by a vacuum pump so that the pressure would be $1.33 \times 10^{-4}$ Pa, and the critical temperature-raising rate at which the bulb did not fracture was obtained. This is an index of the upper limit of the temperature-raising rate in the evacuation step of the bulb. It is preferably at least 15° C./min.

Quenching test after sealing: The glass frit was interposed between a glass funnel (expansion coefficient: $98 \times 10^{-7}/°$ C.) and a glass panel (expansion coefficient: $98 \times 10^{-7}/°$ C.) of the 29 inch type color cathode ray tube, and the glass funnel and the glass panel were sealed under baking conditions as identified in Table 1 or 2, followed by quenching from the sealing temperature to 300° C. at a temperature-lowering rate of 50° C./min. By excess tensile stress at the sealed portion generated by this quenching, the assembly was forcibly fractured at the sealed portion, and the crack source was examined. The assembly preferably does not fracture at the interface of the sealed portion in order to seal the glass panel and the glass funnel.

Area ratio of crystal: The cross-section of the sealed portion at the crack source in the above quenching test after sealing was observed by an electron microscope, and an area proportion of crystals precipitated on the interface between the sealing layer (sintered glass frit) and the glass funnel for example expediently (crystals due to reaction of the glass frit and the glass funnel) was obtained from a reflected electron image. The proportion is obtainable simultaneously in a case of the glass panel. These crystals may be recognizable as portions which are brighter than the glass portion of the glass panel or the glass funnel and having a slightly darker contrast than the first crystals ($2PbO.ZnO.B_2O_3$) in the inside of the sealing layer. The area proportion is a percentage of the total area of crystals present in a region from the interface to the depth of 5 $\mu$m from the surface of the sealing layer, in a longitudinal section in a width direction at the edge of the sealed portion, i.e. a cross-section which intersects the edge of the sealed portion and which is perpendicular to the adhesion surface, at the sealed portion of the glass panel and the glass funnel. An area ratio of crystal of at least 50% is required from the viewpoint of the sealing strength at the interface at the sealed portion with the glass panel or the glass funnel.

Tensile vacuum deforming stress: A strain gauge was attached in the vicinity of the sealed portion of the sealed glass bulb, and the strain on the glass surface generated under vacuum (at most $1.33 \times 10^{-4}$ Pa) was calculated as the stress to obtain a maximum tensile vacuum deforming stress.

With respect to each of the glass bulbs for a color cathode ray tube employing the glass frits of Examples 1 to 14 of the present invention, both the hydraulic pressure resistant strength and the critical evacuation temperature-raising rate were adequately high, the crack source was not on the interface in the quenching test after sealing, and a high sealing strength could be obtained at the interface at the sealed portion. Accordingly, it is found that the glass frit (sintered glass frit) of the present invention provides a high sealing strength. Further, the area ratio of crystal at the sealing interface with the glass panel or the glass funnel was at least 50% in each Example.

On the other hand, with respect to the bulbs of Examples 15 to 21, both the hydraulic pressure resistant strength and the critical evacuation temperature-raising rate were low, the crack source was on the interface in the quenching test after sealing in Examples 15, 17 and 19, and the sealing strength by the glass frit (sintered glass frit) was low. The area ratio of crystal at the interface at the sealed portion was less than 50% in each Example.

Industrial Applicability

According to the present invention, the sealing force at the interface at the sealed portion between the sintered glass frit and the glass panel and between the sintered glass frit and the glass funnel can be remarkably improved, whereby the sealed portion can adequately tolerate a tensile vacuum deforming stress of from 7 to 10 MPa generated at at least part of the sealed portion as a result of making the glass thin, and thus weight saving of a color cathode ray tube can be attempted.

Further, the glass frit of the present invention has remarkably excellent strength properties as compared with a conventional glass frit, by addition of, in addition to a crystalline low melting glass powder, an $\alpha$-4PbO.$B_2O_3$ crystal powder and/or a $Pb_3O_4$ crystal powder, from 0.1 to 5% as represented by mass percentage of an $\alpha$-alumina powder especially a corpuscular $\alpha$-alumina powder having a particle size not larger than 3 $\mu$m, or from 0.1 to 5% of a crystallizing filler containing at least one member selected from the group consisting of MgO, $Fe_2O_3$ and monoclinic-$ZrO_2$. Namely, not only the strength of the glass frit itself improves, but also wettability with the glass to be sealed is improved, and an appropriate seal shape can be obtained so that no excess tensile stress is generated, and further, reactivity with the glass can be accelerated, and the area ratio of crystal at the interface at the sealed portion can be increased, whereby the sealing strength can be increased.

The entire disclosures of Japanese Patent Application No. 2000-356582 filed on Nov. 22, 2000 and Japanese Patent Application No. 2000-356583 filed on Nov. 22, 2000 including specifications, claims and summaries are incorporated herein by reference in their entireties.

TABLE 1

| | | | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|---|
| Glass frit | Crystalline low melting glass powder | | 94.65 | 92.70 | 98.30 | 94.80 | 93.70 | 94.65 | 91.30 | 93.60 | 92.60 | 93.70 |
| | Filler | Crystallizing filler | | | | | | | | | | |
| | | MgO | 0.00 | 0.00 | 0.00 | 0.00 | 0.00 | 0.00 | 0.00 | 1.00 | 3.50 | 0.00 |
| | | $Fe_2O_3$ | 0.00 | 0.00 | 0.00 | 0.00 | 0.00 | 1.00 | 4.00 | 0.00 | 0.00 | 0.00 |
| | | Monoclinic-$ZrO_2$ | 0.00 | 0.00 | 0.00 | 0.00 | 0.00 | 0.00 | 0.00 | 0.00 | 0.00 | 0.50 |
| | | $\alpha$-4PbO.$B_2O_3$ crystal powder | 0.00 | 0.00 | 0.00 | 0.00 | 0.00 | 0.00 | 0.00 | 0.00 | 0.00 | 0.00 |
| | | $Pb_3O_4$ crystal powder | 0.15 | 0.10 | 0.20 | 0.10 | 0.15 | 0.15 | 0.10 | 0.20 | 0.20 | 0.15 |
| | | Total | 0.15 | 0.10 | 0.20 | 0.10 | 0.15 | 1.15 | 4.10 | 1.20 | 3.70 | 0.65 |
| | | Low expansion filler | | | | | | | | | | |
| | | $\alpha$-alumina | | | | | | | | | | |
| | | Particle size not larger than 3 $\mu$m | 3.00 | 4.50 | 0.50 | 4.50 | 1.50 | 2.00 | 1.50 | 3.00 | 2.50 | 2.00 |
| | | Particle size larger than 3 $\mu$m | 2.00 | 2.50 | 0.00 | 0.50 | 4.50 | 2.00 | 3.00 | 2.00 | 1.00 | 3.50 |
| | | Total | 5.00 | 7.00 | 0.50 | 5.00 | 6.00 | 4.00 | 4.50 | 5.00 | 3.50 | 5.50 |
| | | Zircon | 0.20 | 0.20 | 0.20 | 0.10 | 0.15 | 0.20 | 0.10 | 0.20 | 0.20 | 0.15 |
| | | $\beta$-eucryptite | 0.00 | 0.00 | 0.30 | 0.00 | 0.00 | 0.00 | 0.00 | 0.00 | 0.00 | 0.00 |
| | | $\beta$-spodumene | 0.00 | 0.00 | 0.50 | 0.00 | 0.00 | 0.00 | 0.00 | 0.00 | 0.00 | 0.00 |
| | | Total | 5.20 | 7.20 | 1.50 | 5.10 | 6.15 | 4.20 | 4.60 | 5.20 | 3.70 | 5.65 |
| | total | | 5.35 | 7.30 | 1.70 | 5.20 | 6.30 | 5.35 | 8.70 | 6.40 | 7.40 | 6.30 |
| Total | | | 100.0 | 100.0 | 100.0 | 100.0 | 100.0 | 100.0 | 100.0 | 100.0 | 100.0 | 100.0 |
| Baking temperature (° C.) | | | 440 | 440 | 440 | 440 | 440 | 440 | 440 | 440 | 440 | 440 |
| Maximum tensile vacuum deforming stress (MPa) | | | 8.50 | 8.50 | 7.50 | 7.50 | 9.50 | 8.50 | 8.50 | 9.00 | 8.50 | 9.00 |
| Bulb evaluation | | | | | | | | | | | | |
| Hydraulic pressure resistant strength (MPa) | | | 0.54 | 0.52 | 0.47 | 0.51 | 0.52 | 0.50 | 0.55 | 0.52 | 0.50 | 0.52 |
| Critical evacuation temperature-raising rate (° C./min) | | | >15 | >15 | ≧15 | ≧15 | ≧15 | ≧15 | ≧15 | ≧15 | ≧15 | ≧15 |
| Crack source in quenching test | | | Fillet | Fillet | Sealing material | Sealing material | Fillet | Sealing material | Fillet | Fillet | Fillet | Fillet |
| Area ratio of crystal (%) | | | 82 | 84 | 70 | 85 | 80 | 82 | 86 | 85 | 86 | 80 |

TABLE 2

| | | Ex. 11 | Ex. 12 | Ex. 13 | Ex. 14 | Ex. 15 | Ex. 16 | Ex. 17 | Ex. 18 | Ex. 19 | Ex. 20 | Ex. 21 |
|---|---|---|---|---|---|---|---|---|---|---|---|---|
| Glass frit | Crystalline low melting glass powder | 93.75 | 92.20 | 96.90 | 93.65 | 99.40 | 89.20 | 89.20 | 89.40 | 91.30 | 89.70 | 92.80 |
| | Filler  Crystallizing filler | | | | | | | | | | | |
| | MgO | 0.00 | 0.50 | 0.00 | 0.00 | 0.00 | 0.00 | 0.00 | 6.50 | 0.00 | 0.00 | 0.00 |
| | $Fe_2O_3$ | 2.00 | 2.50 | 0.00 | 1.00 | 0.00 | 0.00 | 0.00 | 0.00 | 0.00 | 0.00 | 7.00 |
| | Monoclinic-$ZrO_2$ | 0.00 | 0.00 | 0.05 | 0.00 | 0.00 | 0.00 | 0.00 | 0.00 | 0.00 | 2.00 | 0.00 |
| | α-$4PbO\cdot B_2O_3$ crystal powder | 0.05 | 0.00 | 0.05 | 0.00 | 0.00 | 0.00 | 0.00 | 0.40 | 0.00 | 0.00 | 0.00 |
| | $Pb_3O_4$ crystal powder | 0.00 | 0.10 | 0.00 | 0.15 | 0.10 | 0.10 | 0.40 | 0.40 | 0.00 | 0.20 | 0.00 |
| | Total | 2.05 | 3.10 | 0.10 | 1.15 | 0.10 | 0.10 | 0.40 | 7.30 | 0.00 | 2.20 | 7.00 |
| | Low expansion filler | | | | | | | | | | | |
| | α-alumina | | | | | | | | | | | |
| | Particle size not larger than 3 μm | 1.00 | 2.50 | 1.50 | 0.00 | 0.00 | 6.00 | 0.00 | 0.00 | 2.00 | 5.00 | 0.00 |
| | Particle size larger than 3 μm | 3.00 | 2.00 | 0.50 | 5.00 | 0.00 | 4.50 | 8.00 | 0.00 | 6.50 | 3.00 | 0.00 |
| | Total | 4.00 | 4.50 | 2.00 | 5.00 | 0.00 | 10.50 | 8.00 | 0.00 | 8.50 | 8.00 | 0.00 |
| | Zircon | 0.20 | 0.20 | 0.20 | 0.20 | 0.50 | 0.20 | 0.40 | 0.30 | 0.20 | 0.10 | 0.20 |
| | β-eucryptite | 0.00 | 0.00 | 0.30 | 0.00 | 0.00 | 0.00 | 1.00 | 1.50 | 0.00 | 0.00 | 0.00 |
| | β-spodumene | 0.00 | 0.00 | 0.50 | 0.00 | 0.00 | 0.00 | 1.00 | 1.50 | 0.00 | 0.00 | 0.00 |
| | Total | 4.20 | 4.70 | 3.00 | 5.20 | 0.50 | 10.70 | 10.40 | 3.30 | 8.70 | 8.10 | 0.20 |
| Total | | 6.25 | 7.80 | 3.10 | 6.35 | 0.60 | 10.80 | 10.80 | 10.60 | 8.70 | 10.30 | 7.20 |
| Total | | 100.0 | 100.0 | 100.0 | 100.0 | 100.0 | 100.0 | 100.0 | 100.0 | 100.0 | 100.0 | 100.0 |
| Baking temperature (° C.) | | 440 | 440 | 440 | 440 | 440 | 440 | 440 | 440 | 440 | 440 | 440 |
| Maximum tensile vacuum deforming stress (MPa) | | 9.00 | 8.50 | 8.50 | 8.50 | 9.50 | 8.50 | 8.50 | 8.50 | 8.50 | 9.50 | 8.50 |
| Bulb evaluation | | | | | | | | | | | | |
| Hydraulic pressure resistant strength (MPa) | | 0.54 | 0.50 | 0.48 | 0.52 | 0.33 | 0.37 | 0.44 | 0.32 | 0.40 | 0.37 | 0.32 |
| Critical evacuation temperature-raising rate (° C./min) | | ≧15 | ≧15 | ≧15 | ≧15 | ≧13 | ≧13 | ≧11.5 | ≧11.5 | ≧11.5 | ≧11.5 | ≧13 |
| Crack source in quenching test | | Sealing material | Fillet | Sealing material | Sealing material | Interface | Fillet | Interface | Fillet | Interface | Fillet | Fillet |
| Area ratio of crystal (%) | | 82 | 85 | 75 | 80 | 40 | 46 | 32 | 43 | 35 | 42 | 46 |

What is claimed is:

1. A color cathode ray tube having a sealed portion at which a glass panel and a glass funnel are sealed by means of a sintered glass frit, wherein
a maximum tensile stress generated at the sealed portion is from 7 to 10 MPa when an inside of said color cathode ray tube is vacuumized,
the sintered glass frit contains at least a low expansion filler containing α-alumina and a crystalline low melting glass, and
an area ratio of crystal is at least 50% at an interface at the sealed portion at at least a region at which the maximum tensile stress is generated.

2. The color cathode ray tube according to claim 1, wherein the sintered glass frit contains a low expansion filler containing α-alumina and a crystalline low melting glass, wherein contents of the low expansion filler and the crystalline low melting glass represented by mass percentage based on the sintered glass frit are as follows:
crystalline low melting glass: 90–99%,
low expansion filler: 1–10%,
and content of the α-alumina is from 0.1 to 7% based on the sintered glass frit.

3. The color cathode ray tube according to claim 2, wherein part of particles of the α-alumina is corpuscular α-alumina having a particle size not larger than 3 μm, and a content of the corpuscular α-alumina is from 0.1 to 5% represented by mass percentage based on the sintered glass frit.

4. The color cathode ray tube according to claim 2, wherein the crystalline low-melting glass consists essentially of, represented by mass percentage based on following oxides:

| | |
|---|---|
| PbO: | 71–81.99%, |
| ZnO: | 9–16%, |
| $B_2O_3$: | 7–10%, |
| $SiO_2$: | 1–3%, |
| BaO: | 0–3%, |
| CaO: | 0–3%, |
| SrO: | 0–3%, |
| $Li_2O$: | 0–3%, |
| $Na_2O$: | 0–3%, |
| $K_2O$: | 0–3%, |
| $Al_2O_3$: | 0–5%, |
| $Bi_2O_3$: | 0–10%. |

5. The color cathode ray tube according to claim 1, wherein the sintered glass frit contains a low expansion filler containing α-alumina, a crystalline low melting glass and a crystallizing filler containing MgO and/or $Fe_2O_3$, and contents of the above respective components represented by mass percentage based on the sintered glass frit are as follows:

crystalline low melting glass: 90–98.9%, low expansion filler: 1–9.9%, and a content of the α-alumina is from 0.1 to 7% based on the sintered glass frit.

6. The color cathode ray tube according to claim 5, wherein a sum of masses of the MgO and $Fe_2O_3$ is from 0.1 to 5% represented by mass percentage based on the sintered glass frit.

7. The color cathode ray tube according to claim 1, wherein the above sintered glass frit contains a low expansion filler containing α-alumina, a crystalline low melting glass and monoclinic-$ZrO_2$ as a crystallizing filler, and contents of the respective components represented by mass percentage based on the sintered glass frit are as follows:

crystalline low melting glass: 90–98.99%, low expansion filler: 1–9.99%, and a content of the α-alumina is from 0.1 to 7% based on the sintered glass frit.

8. The color cathode ray tube according to claim 7, wherein a content of the monoclinic-$ZrO_2$ is from 0.01 to 1% represented by mass percentage based on the sintered glass frit.

9. The color cathode ray tube according to claim 1, wherein the low expansion filler contains at least one member selected from a group consisting of zircon, cordierite, mullite, lead titanate, silica, β-eucryptite, β-spodumene and β-quartz solid solution.

10. A glass frit, for color cathode ray tubes, which comprises a crystalline low melting glass powder, a low expansion filler containing α-alumina, and a crystallizing filler consisting of an α-4PbO.$B_2O_3$ crystal powder and/or a $Pb_3O_4$ crystal powder, wherein part of the α-alumina is corpuscular α-alumina having a particle size not larger than 3 μm, and contents of the above respective components represented by mass percentage based on said glass frit are as follows:

crystalline low melting glass powder: 90–99%, low expansion filler: 1–10%, and a content of the α-alumina is from 0.1 to 7% based on a sintered glass frit, and a content of the corpuscular α-alumina of the α-alumina is from 0.1 to 5% based on the sintered glass frit.

11. The glass frit according to claim 10, wherein the crystalline low-melting glass powder consists essentially of, represented by mass percentage based on following oxides:

| | |
|---|---|
| PbO: | 71–81.99%, |
| ZnO: | 9–16%, |
| $B_2O_3$: | 7–10%, |
| $SiO_2$: | 1–3%, |
| BaO: | 0–3%, |

-continued

| | |
|---|---|
| CaO: | 0–3%, |
| SrO: | 0–3%, |
| $Li_2O$: | 0–3%, |
| $Na_2O$: | 0–3%, |
| $K_2O$: | 0–3%, |
| $Al_2O_3$: | 0–5%, |
| $Bi_2O_3$: | 0–10%. |

12. The glass frit for color cathode ray tubes according to claim 10, wherein the low expansion filler contains at least one member selected from a group consisting of zircon, cordierite, mullite, lead titanate, silica, β-eucryptite, β-spodumene and β-quartz solid solution.

13. A glass frit for color cathode ray tubes, which comprises a crystalline low melting glass powder, a low expansion filler containing α-alumina, and a crystallizing filler containing at least one member selected from a group consisting of an α-4PbO.$B_2O_3$ crystal powder and/or a $Pb_3O_4$ crystal powder, MgO, $Fe_2O_3$ and monoclinic-$ZrO_2$, wherein contents of the respective components represented by mass percentage based on the glass frit are as follows:

crystalline low melting glass powder: 90–98.99%, low expansion filler: 1–9.99%, crystallizing filler: 0.01–5%, and a content of the α-alumina is from 0.1 to 7% based on the glass frit.

14. The glass frit according to claim 13, wherein the crystalline low-melting glass powder consists essentially of, represented by mass percentage based on following oxides:

| | |
|---|---|
| PbO: | 71–81.99%, |
| ZnO: | 9–16%, |
| $B_2O_3$: | 7–10%, |
| $SiO_2$: | 1–3%, |
| BaO: | 0–3%, |
| CaO: | 0–3%, |
| SrO: | 0–3%, |
| $Li_2O$: | 0–3%, |
| $Na_2O$: | 0–3%, |
| $K_2O$: | 0–3%, |
| $Al_2O_3$: | 0–5%, |
| $Bi_2O_3$: | 0–10%. |

15. The glass frit for color cathode ray tubes according to claim 13, wherein the low expansion filler contains at least one member selected from a group consisting of zircon, cordierite, mullite, lead titanate, silica, β-eucryptite, β-spodumene and β-quartz solid solution.

* * * * *